UNITED STATES PATENT OFFICE.

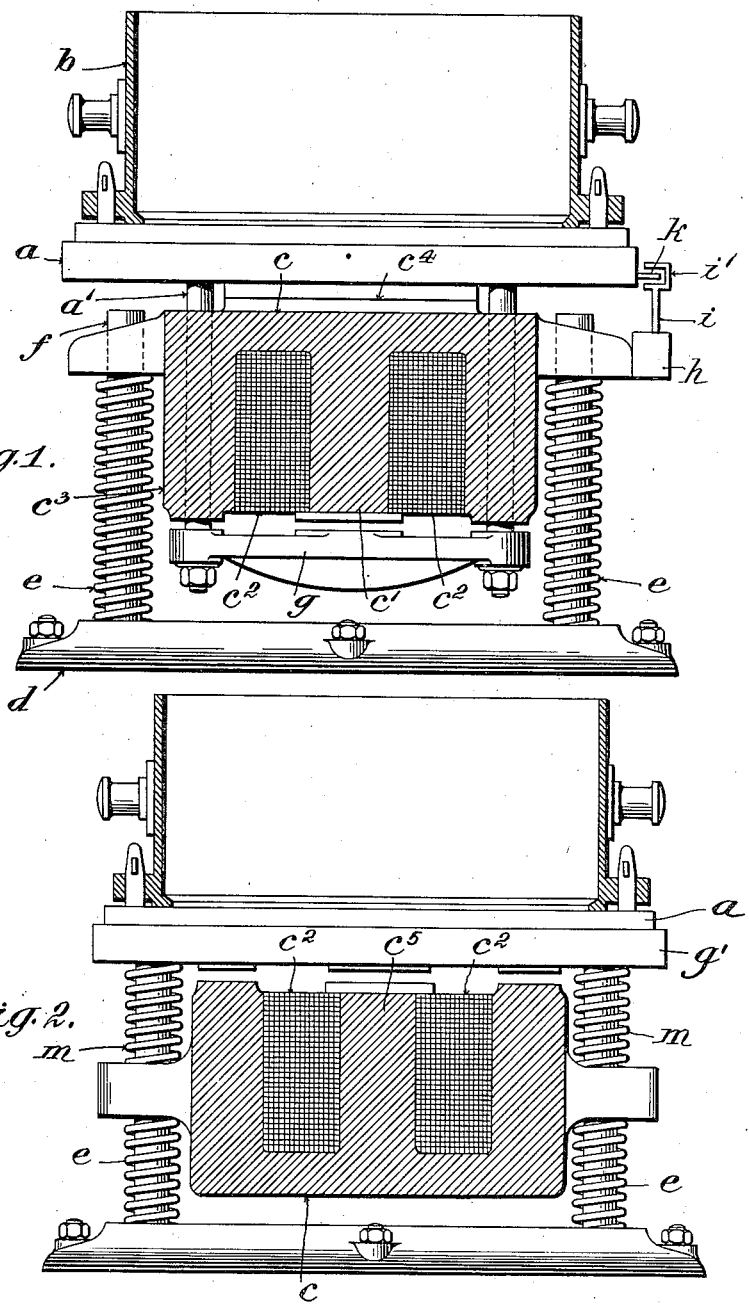

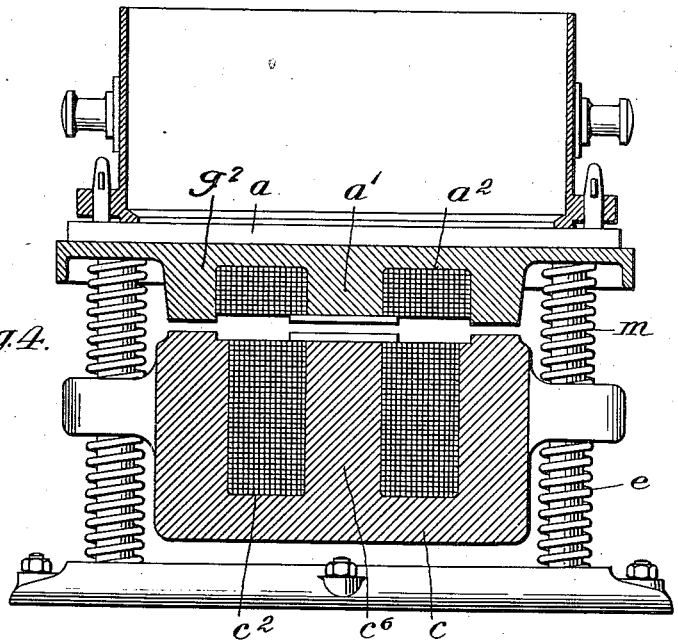
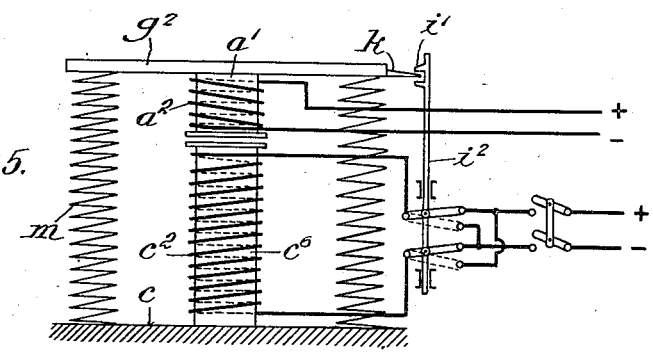
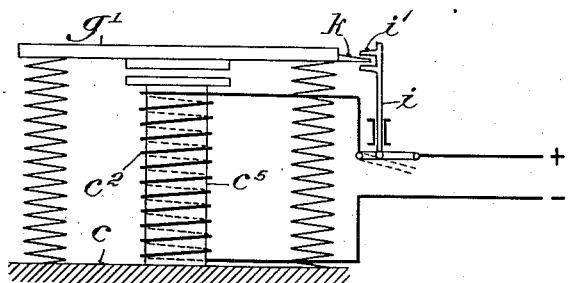

KARL OTTO DAHLMEYER, OF BERLIN, GERMANY.

JAR-MOLDING MACHINE.

1,138,457.  Specification of Letters Patent.  Patented May 4, 1915.

Application filed January 13, 1915. Serial No. 1,999.

*To all whom it may concern:*

Be it known that I, KARL OTTO DAHLMEYER, a subject of the German Emperor, and resident of the city of Berlin, Germany, have invented new and useful Improvements in Jar-Molding Machines, of which the following is a specification.

This invention relates to a new electrically driven molding-machine with shaking motion.

In electrically driven molding machines with shaking motion hitherto employed, the available electricity had to be led into an electromotor where it produced rotatory forces in the usual manner, by using a stationary field magnet and a rotating armature, which forces acted upon the moving parts of the shaking machine by means of a suitable gear.

In accordance with the present invention, a more simple method has been adopted, by altogether dispensing with rotatory motions. On the contrary, mere oscillations are produced by electricity or by the magnetism produced thereby, in which case the anvil and table masses are profitably used as magnets. By this means, all moving parts in the shaking machine are dispensed with, with the exception of the anvil and table and the switching devices for the electric current, which latter contain very small masses. In this case it is of importance to distribute the magnetism in such a manner that the forces, which drive the table against the anvil and vice versa, be distributed on a large surface, so that the strain of the table caused by deflection is very small. It is also essential that both the table and the anvil be easily movable, so that, when they strike against each other, for instance in the case of the so-called shockless molding machines with shaking motion driven by other means, a reciprocal damping takes place, while a shock cannot be transmitted to the base plate.

In the accompanying drawings, Figure 1 is a section through a molding machine of the new type. Fig. 2 is a modification of the same. Fig. 3 represents a connection suitable for the construction according to Figs. 1 and 2. Fig. 4 shows a different form of construction in accordance with the present invention. Fig. 5 shows the connection belonging to Fig. 4.

In the form of construction shown in Fig. 1, $a$ represents the table, which carries the molding box $b$; $c$ is the anvil, which rests on the base plate $d$ by means of springs $e$ and is held vertically by the posts $f$, which pass through the springs $e$. The anvil $c$ has the form of an electromagnet, which is preferably so constructed that the inner core $c^1$ is surrounded by a winding $c^2$ said winding being protected by a cover $c^3$ belonging to the anvil. Through this cover, bolts, preferably made of bronze and suspended from the lower side of the table, are led, which carry an armature $g$ arranged opposite the core $c^1$. Thus, the anvil $c$ is held in a state of suspension by the springs $e$ and carries on its striking surface $c^4$ the table $a$ with a molding box $b$ and, by the instrumentality of the bolts, also the armature $g$. If, now, an electric current is sent through the winding $c^2$ of the anvil, the armature $g$ will be attracted, thereby raising the table $a$ from the surface $c^4$. Since the anvil rests on springs, it will at the same time be slightly depressed. When interrupting the current, the anvil and the table will immediately assume the position shown in Fig. 1, in which case the table will strike against the surface $c^4$ of the anvil, thereby producing a corresponding shaking-motion on the molding box. The opening and closing of the current may be effected in any desired manner, as for instance, by using a suitable hand-operated switch, independently of the movement of the table. The switch is, however, preferably arranged to be shifted automatically by the reciprocal movement of the table and the anvil, in a manner similar to the operation of valves in pressure-actuated molding machines. For this purpose, a switch of the usual construction is arranged in a casing $h$, which is connected with the anvil, in which casing the commutation is effected by the oscillating motion of a rod $i$, which projects from the casing. The rod $i$ carries a fork $i^1$, into which a pin $k$ engages, which is connected with the table $a$. The connection is diagrammatically shown in Fig. 3 in which figure the winding is marked $c^2$; the core $c^5$; and $g^1$ is an armature connected to the table $a$, as more particularly shown in Fig. 2. In the position shown, the switch is closed. Thus, the magnet $c^5$ will be excited, while, during the reciprocal motion of $g^1$ and $c^5$, the rod $i$ will also be moved and the circuit opened. At this moment, the table will follow the action of the springs $e$ and move again upward, when it closes the circuit, so that the whole process repeats itself.

Fig. 2 is a form of construction similar to Fig. 1, with the only difference, that the electromagnet core $c^5$ of the anvil $c$ with its free pole is directed upward. Thus, the armature $g$ can be dispensed with, since the table $a$ has the form of an armature, as shown at $g^1$. As before, the anvil rests upon the base plate by the instrumentality of the springs $e$, but it carries the table $a$ by the instrumentality of other springs $m$. When the magnet core $c^1$ of the anvil is excited, the anvil will attract the table $a$ electromagnetically, in which case the springs $m$ are compressed correspondingly. When the current is interrupted, there will be no electromagnetic attraction between table and anvil. Owing to its gravity, the anvil will drop, slightly compressing the spring $e$, while the springs $m$ will shift the table upward. By this means, a separation takes place, while, by the above mentioned connection and disconnection of the electromagnet, the process constantly repeats itself, thereby producing the desired action.

In the case of Fig. 4, both the table and the anvil are energized. The construction is similar to that described for Fig. 2, with the only difference that the armature $g^2$ of the table $a$ is likewise provided with a winding $a^2$, which is preferably energized in the same sense during the whole shaking process, while the winding $c^2$ of the anvil $c$ is energized with interruptions or with changing direction. Thus, when the cores $a^1$ and $c^6$ are not of the same polarity, a reciprocal attraction of anvil and table will take place, whereas, if they are of the same polarity, a repulsion will take place. The poles can be quickly changed in such a manner that the winding $a^2$ is energized by direct current and the winding $c^2$ by alternating or phase current, or that as shown in Fig. 5, a switching rod 1 is moved from the table $a$, which transmits the current alternately through the winding $a^2$ in either sense, as soon as the current is switched in. The movements of the switch, which are to be deduced from the rod $i$, are obvious. The current, which passes through the winding $a^2$, may also be connected and disconnected or reversed.

Claims:

1. In a jar-molding machine, the combination of a bed, an anvil, means mounted on said bed for yieldingly supporting said anvil, an electromagnet constructed in said anvil, a mold-carrying table, and an armature for said electromagnet connected to actuate said table, substantially as described.

2. In a jar-molding machine, the combination of a bed, an anvil, means for yieldingly supporting said anvil, an electromagnet mounted on said anvil, a mold-carrying table, an armature for said electromagnet connected to actuate said table, and means for automatically closing and interrupting the circuit through said electromagnet, substantially as described.

3. In a jar-molding machine, the combination of a bed, an anvil, spring means for yieldingly supporting said anvil from the bed, an electromagnet mounted on said anvil, a mold-carrying table, an armature for said electromagnet connected to actuate said table, a circuit for said electromagnet, a switch included in said circuit, and means arranged between said table and anvil for automatically shifting said switch to close and interrupt said circuit, substantially as described.

4. In a jar-molding machine, the combination of a bed, an anvil, spring means mounted on said bed for yieldingly supporting said anvil, an electromagnet movable with said anvil, a mold-carrying table supported from said anvil, an armature for said electromagnet connected to actuate said table, a circuit for said electromagnet, an interrupter included in said circuit and mounted on one movable element of the machine, and means on the other movable element for engaging and actuating said interrupter, substantially as described.

5. In a jar-molding machine, the combination of a bed, a hollow anvil supported from said bed and formed with a central core, a winding located in said anvil and constituting with said core an electromagnet, a mold-carrying table, and an armature for said electromagnet connected to actuate said table, substantially as described.

6. In a jar-molding machine, the combination of a bed, spring means mounted on said bed, a hollow anvil supported on said spring means and provided with a central core, a winding located in said hollow anvil and constituting with said core an electromagnet, a mold-carrying table, an armature for said electromagnet, a circuit for said electromagnet, an interrupter included in said circuit, and means arranged between said anvil and table for actuating said interrupter, substantially as described.

7. In a jar-molding machine, the combination of a bed, an anvil, spring means mounted on said bed for supporting said anvil, an electromagnet connected to move with said anvil, a mold-carrying table, spring means for supporting said table from said anvil, and an armature for said electromagnet connected to actuate said table, substantially as described.

8. In a jar-molding machine, the combination of a bed, an anvil, supported on said bed, an electromagnet connected to said anvil, a mold-carrying table supported above said anvil, a polarized armature for said electromagnet connected to move with said table, and means for reversing the polarity in said electromagnet, substantially as described.

9. In a jar-molding machine, the combination of a bed, an anvil supported from said bed, an armature connected to said anvil, a mold-carrying table movably supported above said anvil, a polarized armature for said electromagnet mounted on said table, a circuit for said electromagnet, a pole-changer included in said circuit, and means arranged between the movable elements of the machine for actuating said pole-changer to reverse the polarity in said circuit, substantially as described.

10. In a jar-molding machine, the combination of a bed, spring means mounted on said bed, an anvil supported on said spring means, an electromagnet mounted to move with said anvil, a mold-carrying table supported above said anvil and movable relatively thereto, a polarized armature carried by said table, and means for reversing the polarity in said electromagnet, substantially as described.

11. In a jar-molding machine, the combination of a bed, spring means mounted on said bed, an anvil yieldingly supported in said spring means, an electromagnet mounted to move with said anvil, spring means mounted on said anvil, a mold-carrying table supported on said spring means, a polarized armature mounted to move with said table, a circuit for said armature, a pole-changer included in said circuit, and means for actuating said pole-changer to reverse the polarity in said circuit, substantially as described.

12. In a jar-molding machine, the combination of a bed, spring means mounted on said bed, a hollow anvil yieldingly supported in said spring means and formed with a central integral core, a winding located in said hollow anvil and constituting an electromagnet with said core, spring means mounted on said anvil, a mold-carrying table yieldingly supported from said spring means, a polarized armature mounted to move with said table, a circuit for said electromagnet, a pole-changer included in said circuit, and means arranged between the movable elements of the machine for actuating said pole-changer to reverse the polarity in said circuit, substantially as described.

In testimony, that I claim the foregoing as my invention, I have signed my name in presence of two witnesses, this 22d day of December, 1914.

KARL OTTO DAHLMEYER.

Witnesses:
WALTER WEILL,
HENRY HASPER.